Patented Aug. 28, 1951

2,565,653

UNITED STATES PATENT OFFICE 2,565,653

SUBSTANTIALLY PURE DIHYDROSTREPTO-MYCIN-B BASE AND SALTS THEREOF AND METHOD OF OBTAINING SAME

Josef Fried and Elwood O. Titus, New Brunswick, and James A. Shannon, Metuchen, N. J., assignors to E. R. Squibb & Sons, New York, N. Y., a corporation of New York No Drawing. Application March 26, 1947, Serial No. 737,400

5 Claims. (Cl. 260—210)

This invention relates to antibiotics.

Prior to this invention, it had been shown (Proc. Soc. Exp. Biol. and Med., 1944, 55, 66) that a potent antibiotic, termed "streptomycin" was formed during the growth of the organism *Actinomyces griseus* (now called *Streptomyces griseus*); also, it had been shown (Proc. Soc. Exp. Biol. Med. 1944, 57, 244) that an antibiotic distinct from "streptomycin" was formed at the same time. This second antibiotic, which has recently been isolated and named "actidione" (J. A. C. S. 69, 474, 1947) was shown to be present in the culture filtrate but more abundantly in the mycelium: and it was shown that, unlike "streptomycin," this second antibiotic is soluble in organic solvents (e. g., acetone, ether, or chloroform), and is not active against gram-negative bacteria.

It has now been found that still another antibiotic is formed at the same time as "streptomycin." This third antibiotic is similar in a number of respects to the "streptomycin" obtained in pure crystalline form as a reineckate and fully characterized (Wintersteiner and Fried application, Serial No. 666,541, filed May 1, 1946, now Patent No. 2,501,014 dated March 21, 1950); accordingly, the heretofore-characterized "streptomycin" is referred to herein as "streptomycin A," and the aforementioned third antibiotic is referred to as "streptomycin B."

It is the object of this invention to provide: [I] pure, crystalline derivatives of streptomycin B, and a method of obtaining them; [II] substantially-pure streptomycin B and other derivatives (especially water-soluble salts) thereof, and methods of obtaining them; and [III] substantially-pure dihydrostreptomycin B and derivatives (especially water-soluble salts) thereof, and methods of obtaining them.

Streptomycin B is conveniently isolated from the less-active, more-firmly-adsorbed fractions (ranging in potency from 150-200 units/mg.) obtained in the purification of streptomycin by the chromatographic method of Carter et al. (J. Biol. Chem. 160, 1945, 337). The presence in such fractions of an antibiotic other than streptomycin, capable of forming maltol in alkaline medium, was inferred from the following observations: (1) these fractions, on treatment with alkali, yielded 2-3 times the quantity of maltol expected from their bio-potency; (2) the application to such fractions of the Craig countercurrent distribution technique (as adapted to streptomycin) afforded distribution curves which demonstrated clearly that "streptomycin B" was the major maltol-forming component present.

Pure, crystalline derivatives of streptomycin B may be obtained by treatment of the aforementioned less-active chromatographic fractions with an organic-base precipitating reagent of the chromium-complex type (inter alia, salts of reinecke acid and rhodanilic acid) in aqueous solution, and fractional crystallization of the streptomycin-B derivative formed, streptomycin A and other contaminants being removed by two or three crystallizations.

From these pure, crystalline derivatives of streptomycin B, substantially pure streptomycin-B base and derivatives thereof may be obtained by a procedure essentially comprising decomposing the derivative with an aqueous solution of a salt of a metal or of an organic base (e. g. pyridine) forming a water-insoluble salt of the organic-base precipitating reagent used, preferably (in the case of the crystalline reineckate) with an aqueous solution of silver sulfate. From the substantially-pure streptomycin-B hydrochloride, for example, which is thus obtained, substantially-pure streptomycin-B base may be obtained by reaction with an equivalent amount of silver carbonate in aqueous solution, and separation of the precipitated silver chloride. The base thus obtained may be converted into various other acid-addition salts (with sulfuric acid, tartaric acid, citric acid, and penicillin, inter alia) by adding the equivalent amount of the acid to the base in aqueous solution, and freeze-drying the solution.

On catalytic hydrogenation of substantially-pure streptomycin B, one mole of hydrogen (per mole of streptomycin B) is taken up, the resulting product (referred to herein as "dihydrostreptomycin B") being antibiotically active. Unlike streptomycin B, dihydrostreptomycin B is not inactivated by carbonyl reagents at room temperature, and does not form maltol in alkaline solution.

The conversion of substantially-pure streptomycin B into dihydrostreptomycin B may be effected by subjecting the substantially-pure streptomycin B to the action of agents other than catalytically-activated hydrogen which are capable of reducing a carbonyl to a carbinol group in a nonalkaline (i. e., acid or neutral) medium.

Catalytic hydrogenation, however, is preferred, and may be effected with a variety of catalysts and under a variety of conditions. Generally, hydrogenation catalysts known to be effective for the conversion of a carbonyl group into a carbinol group may be employed for the purpose of this invention. Among the utilizable catalysts are platinum dioxide (the Adams platinum oxide catalyst), Raney nickel, and palladium black. Advantageously, the catalyst may be employed on a carrier (especially charcoal), to facilitate separation of the catalyst after the treatment. The catalytic-hydrogenation may be effected at superatmospheric pressure (e. g., about 2 to 3 atmospheres) and/or at slightly elevated temperatures, to expedite the hydrogenation; the time of the hydrogenation (varying with the catalyst and conditions employed) being that required to effect the "addition" of substantially one mole of hydrogen per mole of streptomycin B present. The catalytic-hydrogenation may be effected in any medium which does not chemically affect streptomycin B, inter alia, methanol, ethylene glycol, or (preferably) water; and other means than that specifically disclosed hereinafter may be employed to effect intimate contact between the hydrogen and the medium containing the streptomycin B and hydrogenation catalyst.

The dihydrostreptomycin B may be obtained in the form of, or converted into, the substantially-pure free base or various acid-addition salts thereof, the latter being antibiotically active in proportion to their dihydrostreptomycin-B-base content. The substantially-pure dihydrostreptomycin-B acid-addition salts include, inter alia, those of the following acids: hydrochloric, sulfuric, tartaric, citric, and penicillin.

The following examples are illustrative of the invention:

Example 1

[The starting material, a commercial "streptomycin" hydrochloride (trihydrochloride) assaying 400 units/mg. in a broth test against *K. pneumoniae*, may be obtained, for example, by growing *Streptomyces griseus* in submerged culture in an aqueous medium containing soybean meal, dextrose, and sodium chloride, acidifying the incubated culture, treating the filtrate obtained therefrom with an activated charcoal, eluting "streptomycin" from the charcoal with dilute mineral acid, treating the eluate with an organic-base precipitating reagent, and decomposing the precipitate; cf. Patent No. 2,501,014, referred to hereinbefore.]

(a) 10 g. of the streptomycin hydrochloride is dissolved in 100 ml. 80% methanol, and the solution is passed through a column of 3.1 cm. diameter containing 460 g. alumina [which has been acidified to pH 4.5 with 50% sulfuric acid and back-washed with distilled water until the washings are sulfate-free]. The column is then washed with 80% methanol, and the effluent-solution is collected in fractions as soon as it begins to give a positive Sakaguchi test. The following fractions are obtained: (I) 240 ml., containing a mixture of highly-active streptomycins, having a potency of 600 units/mg.; (II) 160 ml. representing a mixture of streptomycins containing about 50% streptomycin B, having a potency of 300 units/mg. [from which streptomycin B may be obtained by re-chromatographing]; (III) 500 ml., containing streptomycin B contaminated with about 10-15% streptomycin A; and (IV) 500 ml., obtained by using water as the eluant, having approximately the same content of streptomycin B as fraction III. Fractions III and IV are combined and freeze-dried (yielding a crude streptomycin B, containing 10-15% streptomycin A and some biologically-inert material).

(b) 1.24 g. of the crude streptomycin B is dissolved in 25 ml. water, and a solution of 1.62 g. ammonium reineckate in 40 ml. water at 40° C. is added. The solution is allowed to cool slowly to room temperature; the resulting mixture, containing crystalline and powdery material, is warmed gently until the crystals dissolve (leaving the powdery material undissolved); the mixture is then filtered; and the filtrate is allowed to crystallize. The crystalline product (a streptomycin-B reineckate) is recrystallized from 50 ml. water, yielding the pure reineckate as large, thin plates containing water of crystallization (8.1%). The anhydrous streptomycin-B reineckate (formed on drying the product in vacuo at 70° C. for two hours) melts at 178–179° C. (corrected; with decomposition), and gives the following figures on analysis: 26.89% carbon; 4.24% hydrogen; 20.1% nitrogen; 22.22% sulfur; and 8.70% chromium. The activity of the pure reineckate (hydrate) in broth test against *K. pneumoniae* (J. Bact. 50, 623, 1945) is about 100 "streptomycin" units/mg.

(c) 943 mg. of the pure streptomycin-B reineckate (hydrate) is dissolved in 50 ml. water, and a 0.6% solution of silver sulfate in water is added. The resulting precipitate of silver reineckate is filtered off, and washed with water. The clear filtrate (and wash) is treated with a 2% aqueous solution of barium chloride until a filtered sample remains clear on addition of either barium chloride or sulfuric acid; the mixture is filtered with the aid of a small amount of charcoal; and the filtrate is freeze-dried, yielding a white, amorphous powder. The product (substantially-pure streptomycin-B hydrochloride), after drying in vacuo at 100° C. for two hours, decomposes at 179–182° C. (corrected), has an $[\alpha]_D^{25}$ of $-47°$ ($c=1.35$ in water), and gives the following figures on analysis: 35.75% carbon; 6.22% hydrogen; 10.9% nitrogen; and 12.4% chlorine.

The thus-obtained streptomycin-B (hydrochloride) possesses antibacterial action in vitro against gram-positive bacteria (such as various strains of *Staph. aureus* and *B. subtilis*), gram-negative rods (such as *E. coli*, *K. pneumoniae*, *S. schottmuelleris* and *E. typhosa*), and acid-fast organisms (such as *M. smegmatis* and *M. tuberculosis*). It is therapeutically effective against *S. schottmuelleris* infections in mice at levels which do not produce toxic symptoms.

Streptomycin B is inactivated by carbonyl reagents at room temperature; and it produces maltol on treatment with hot dilute alkali. On treatment with a dilute acid (e. g., hydrochloric or sulfuric), streptomycin B yields streptidine (or possibly an isomer thereof), identifiable as the crystalline sulfate monohydrate.

Since the filing of this application, the "streptomycin-B" referred to has been identified as a D - mannosido - N - methyl - α - L - glucosaminido-L-streptoside of streptidine [J. A. C. S. 71: 135–9 (Jan. 1949)]; the chemical definition "D-mannosido - N - methyl - L - glucosaminido-streptosido-streptidine" and the name "mannosidostreptomycin" have been proposed therefor [Science 107, 233–4 (March 5, 1948)]; and the latter (short) name has been adopted generally and will be employed for convenience in the claims herein.

Example 2

300 mg. substantially-pure streptomycin-B hydrochloride (obtainable, for example, as described in the foregoing example) is dissolved in 10 ml. water, 50 mg. of a platinum-oxide hydrogenation catalyst is added, and the mixture is shaken in an atmosphere of hydrogen until no more hydrogen is taken up. The hydrogenated mixture is then filtered to remove the catalyst; and the filtrate is freeze-dried. The product, substantially-pure dihydrostreptomycin-B hydrochloride, causes inhibition of the growth of *K. pneumoniae* at about the same levels as streptomycin-B hydrochloride.

Dihydrostreptomycin B is inert to carbonyl reagents and does not form maltol on treatment with alkali. It possesses a weakly basic group (pK a'=7.6; equivalent weight=780).

The substantially-pure dihydrostreptomycin-B hydrochloride may be converted into substantially-pure dihydrostreptomycin-B base by addition of an equivalent amount of silver carbonate to an aqueous solution thereof, filtering off the precipitated silver chloride, and freeze-drying the filtrate. The base thus obtained may be converted into various other acid-addition salts. Thus, the tartrate may be obtained by adding the equivalent amount of tartaric acid to the dihydrostreptomycin-B in aqueous solution, and freeze-drying the solution.

The name "dihydromannosidostreptomycin" will be employed in the claims to identify the "dihydrostreptomycin-B" referred to, in conformance with the explanation given hereinbefore as to the identification and naming of "streptomycin-B."

The invention may be variously otherwise embodied within the scope of the appended claims.

We claim:

1. A compound of the group consisting of dihydromannosidostreptomycin base and salts thereof.

2. A water-soluble salt of dihydromannosidostreptomycin.

3. Dihydromannosidostreptomycin hydrochloride.

4. The method which comprises intimately contacting hydrogen with an aqueous solution of a mannosidostreptomycin acid-addition salt containing a hydrogenation catalyst until substantially one mole hydrogen per mole streptomycin is taken up.

5. A water-soluble salt of the dihydro derivative of a mannosidostreptomycin, the mannosidostreptomycin being at least as pure as a mannosidostreptomycin hydrochloride which, after drying at 100° C. for two hours, decomposes at 179-182° C. (corrected), has an $[\alpha]_D^{25}$ of $-47°$ (c=1.35 in water), and contains 35.75% carbon, 6.22% hydrogen, 10.9% nitrogen, and 12.4% chlorine.

JOSEF FRIED.
ELWOOD O. TITUS.
JAMES A. SHANNON.

REFERENCES CITED

The following references are of record in the file of this patent:

UNITED STATES PATENTS

| Number | Name | Date |
|---|---|---|
| 2,498,574 | Peck | Feb. 21, 1950 |

OTHER REFERENCES

Waksman: Science, v. 107 (March 5, 1948), pp. 233-234, 2 pages.

Bartz et al.: J. A. C. S., v. 68 (1946), pp. 2163-2166, 4 pages.

J. Am. Pharm. Assoc. (Scientific Ed.), vol. 34 (1945); pp. 274-279.

Peck et al.: J. Am. Chem. Soc., vol. 68, pp. 1390-1391.